No Drawing Available.

UNITED STATES PATENT OFFICE.

R. O. LOWREY, OF SALEM, NEW YORK.

IMPROVEMENT IN COMPOSITION OF MATTER FOR THE MANUFACTURE OF WATER-PROOF PAPER AND OTHER ARTICLES.

REISSUED

Specification forming part of Letters Patent No. 71,893, dated December 10, 1867.

CASE C.

*To all whom it may concern:*

Be it known that I, ROBERT O. LOWREY, of Salem, in the county of Washington and State of New York, have invented certain new and useful Improvements in Treatment of Vegetable Fiber for a new Composition; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a new composition of matter, consisting principally of vegetable fiber, treated or united with certain chemical ingredients for the production of a water-proof material for the production of paper, and all articles of manufacture to which it may be adapted, the composition being intended to produce an article much stronger than ordinary paper, and which will not lose its strength when subjected to the action of water.

To form my composition, I take vegetable fiber of any kind, preferably such as is used in the manufacture of paper, and treat it with the following ingredients, either before or after it is formed into paper, or articles, according to the use for which it is intended.

I prepare a solution consisting of gelatine or animal glue, or its known substitutes, in the proportion of four ounces of soap or similar extractive matter, two ounces of glycerine or saccharine matter; or of both combined, two ounces.

These ingredients I dissolve in from two to four quarts of water. I prefer to dissolve the gelatinous material in about one-half of the water, and in the other half then dissolve the soapy matter, and then add the saccharine matter or the glycerine (or the two combined, if both are used) to either of the two solutions, and then mix the two solutions together; or, if preferred, the glycerine and saccharine matter (or either of them, if but one be used) may be united to the compound after the two solutions are mixed together. The solutions I prefer to mix when warm or heated, though it may be done cold. The proportion of saccharine matter or glycerine, or of both, will be varied, according to the degree of hardness or pliability that it is desired to give to the article—the less of these used the harder, and the more, the softer the product will be.

In like manner also, if it be desired to render the article soft and slippery in its nature, so as to prevent chafing from friction, the proportion of the soapy matter will be increased, as compared with the gelatinous. The quantity of water may be increased or decreased, according to the intention to apply the compound in greater or less quantity to the fiber.

With this solution I saturate or otherwise treat the fiber or pulp, or the paper or other articles made therefrom, and after it is dried, by heat or pressure, or both combined, I then submit the product to the action of any suitable astringent solution, which will render it insoluble in water. For this purpose I prefer to use alum and salt in about equal proportions, the alum and salt being dissolved in water to the full extent of all that the water will dissolve or hold in solution at a temperature of from 60° to 65° of Fahrenheit. The material having been first treated by the gelatinous compound, is then treated with the astringent solution from ten to sixty minutes, according to its bulk or thickness, and the strength of the astringent solution. It is then washed or rinsed in water to remove the surplus astringent material, which would otherwise crystalize on its surface. It is then dried, which completes the operation.

The foregoing is the method that I prefer, as being the simplest, and giving the best result; but in my experiments I have ascertained that the same results may be produced to a greater or less degree, by substituting for the gelatine or glue gum arabic or senegal, dextrine, or caseine, or albumen, gluten, starch, or any mixture of any two or more of these; or any one or more of these ingredients may be used with gelatine or glue or both.

Instead of the astringent solution composed of alum and salt, as previously described, the following may be used, viz: tannin or tannic acid, catechu, or any material containing tannin, gallic acid, boracic acid, alum, alone or combined with borax or chrome alum, or any of the salts of the sesquioxide of chromium, or chloride of sodium alone may be used, or any two two or more of these ingredients may be united, and used in place of the alum or salt, but not with so good effect.

If it be desired to give body to the material, without the use of so much fiber, as will be the case in the manufacture of ornamental and other articles, there may be added to the pulp or fiber, clay or aluminious earths, plaster, calcined or otherwise, or ground slates or stones, or the oxides of metals, and for giving color to the mass, any pigment or coloring matter may be added. It is obvious also that these materials may be added to the gelatinous solution or compound, especially where it is desired to form a coating on the surface, instead of mixing them with the fiber or pulp.

By these means I produce a compound that is susceptible of being applied through a very wide range in the arts. It may be made into water-proof papers of various styles and kinds for the manufacture of bags, belting, cordage, harness, roofing, and nearly all articles now made of cloth or leather. It may also be formed into utensils for household use, such as buckets, tubs, basins, &c., also boats, barrels, and all similar articles, and all articles of wearing apparel usually made of paper, and also ornamental articles, such as are now made of papier-maché, and similar substances.

Having thus described my invention, what I claim is—

1. The new compound or composition of matter, produced by the treatment of vegetable fiber, substantially as described.

2. The process herein described, of treating vegetable fiber for producing a new compound, substantially as set forth.

R. O. LOWREY.

Witnesses:
W. C. DODGE,
H. B. MUNN.